Patented June 3, 1947

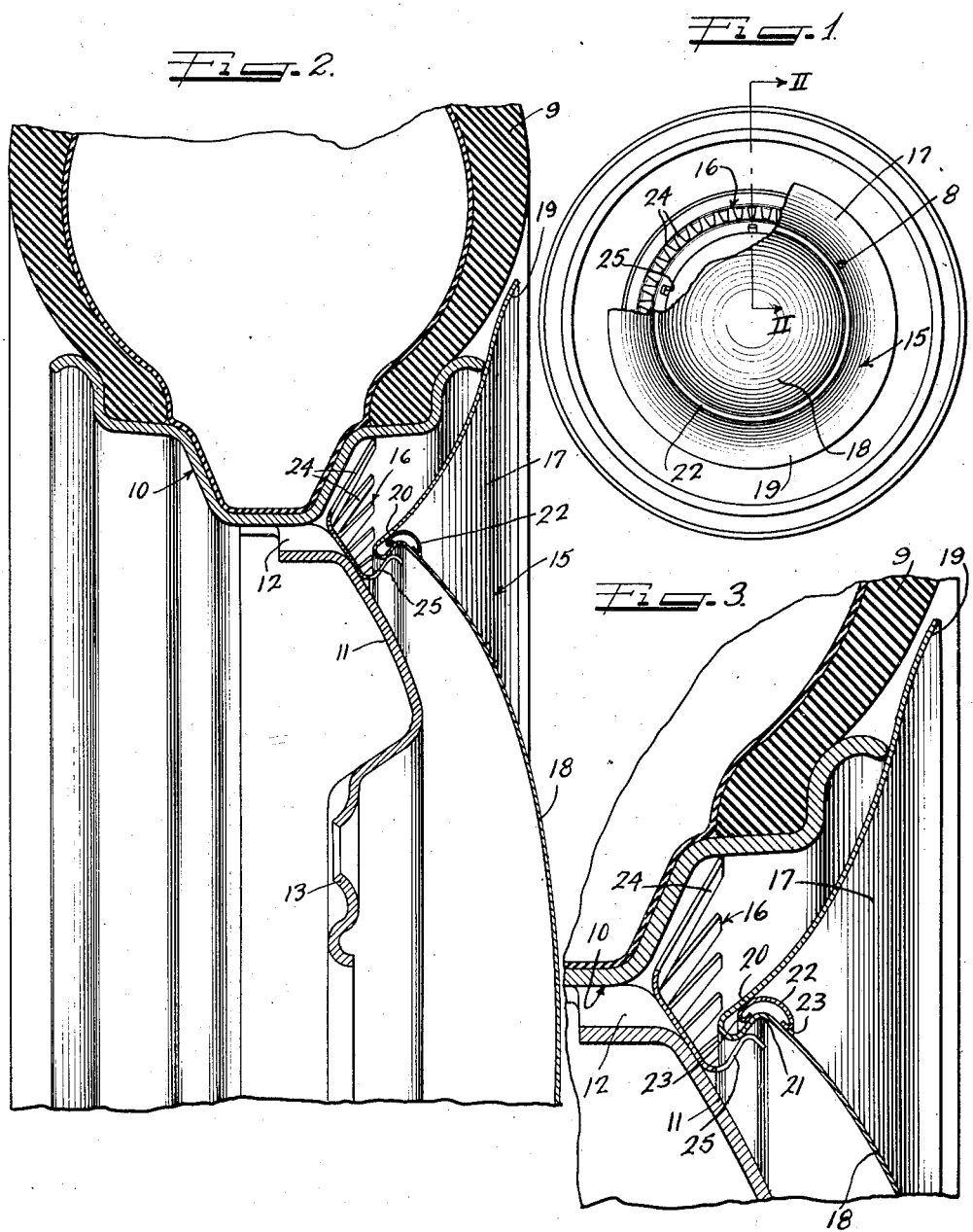

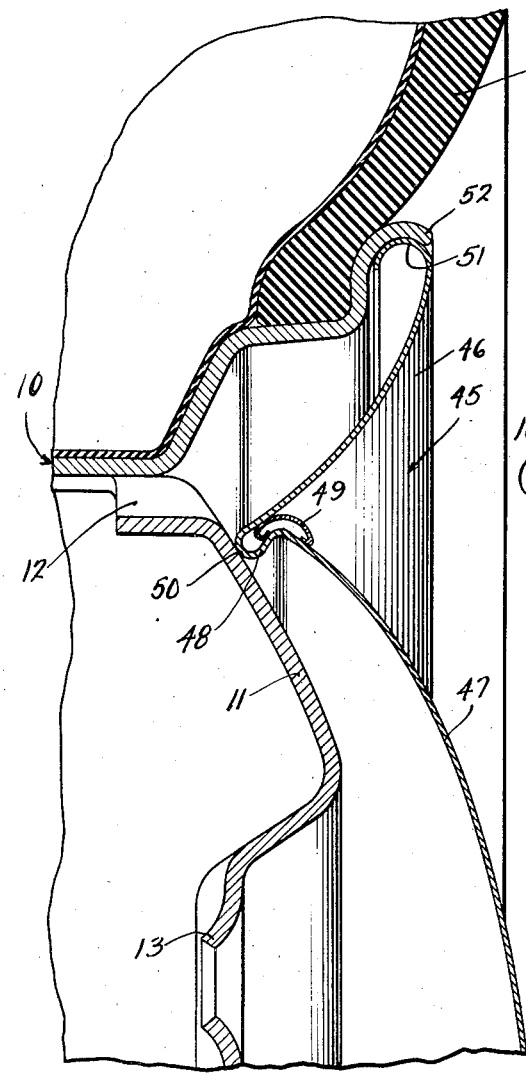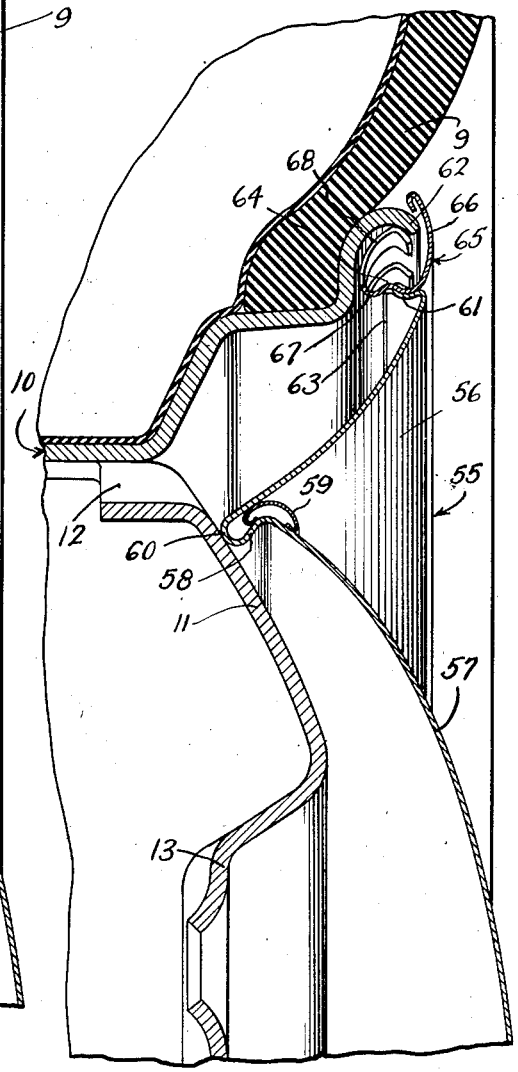

2,421,386

UNITED STATES PATENT OFFICE 2,421,386

WHEEL COVER

George Albert Lyon, Allenhurst, N. J.

Application July 24, 1944, Serial No. 546,267

14 Claims. (Cl. 301—37)

1

This invention relates to a wheel structure, and more particularly to a wheel cover and means for holding the same on wheel.

The subject matter of the first form of this application has been carved in toto from my co-pending application, Serial No. 506,172, filed October 14, 1943; and hence this application is a continuation of my earlier filed one.

An object of this invention is to provide an improved highly ornamental wheel cover which lends itself to fabrication out of plastic and which may be very easily retained on a wheel without altering the configuration of the wheel.

Another object of this invention is to provide reinforcing means for strengthening the intermediate portion of a resilient plastic cover.

A still further object of the invention is to provide a novel arrangement for retaining an ornamental bead on a folded section of a wheel cover.

In accordance with the general features of this invention, there is provided in a wheel an article of manufacture comprising a circular wheel cover having an annular fold radially inwardly of the outer edge of the cover and providing an outwardly opening annular recess, and an annular bead with one of its side edges wedged in the recess.

Still another feature of the invention relates to the location of the fold in the aforementioned cover in such a manner that it may be resiliently engaged by fingers on a retaining ring mounted on a wheel.

Other objects and features of this invention will more fully appear from the following detailed description taken in connection with the accompanying drawings which illustrate a single embodiment thereof, and in which Figure 1 is a fragmentary side view of a wheel structure embodying the features of this invention with a portion of the cover broken away to show the retaining means;

Figure 2 is an enlarged fragmentary cross-sectional view taken on the line II—II of Figure 1, looking in the direction indicated by the arrows, and showing the manner in which the cover is held on the wheel by the fingers of the retaining ring;

Figure 3 is an enlarged fragmentary cross-sectional view corresponding to a right-hand portion of Figure 2 and showing more clearly the manner in which the retaining means cooperates with the folded section of the cover, as well as the manner in which the bead is wedged in the folded section;

2

Figure 4 is a fragmentary cross sectional view similar to Figure 3, showing a modified form of retaining means for the cover; and Figure 5 is a fragmentary cross sectional view similar to Figure 3, illustrating still another form of retaining means for the cover.

As shown on the drawings:

The reference character 9 designates generally a conventional type of pneumatic tube tire mounted on a conventional drop-center multi-flanged tire rim 10. The tire rim 10 has its base flange attached at a plurality of points to a wheel body or spider member 11, which, as is well known in the art, may comprise a metallic stamping. The areas between the points of attachment of the body to the rim are formed into openings 12 for the purpose of allowing air to circulate through the wheel, as is well known in the art.

The central portion of the dished shell-like body 11 is provided with an inwardly offset mounting flange 13 by means of which the wheel may be attached in the usual way by wheel bolts or cap screws (not shown) to a support on the vehicle.

Cooperable with this structure is a wheel cover embodying the features of this invention and designated generally by the reference character 15. This wheel structure is of a unitary form and preferably comprises outer ring and central hub cap sections 17 and 18 joined together by an intermediate folded section 20. This entire cover may be made of any suitable material but excellent results may be attained by forming it out of resiliently flexible plastic sheet which may be easily manually flexed but which will resist permanent deformation. In other words, after any flexure thereof the disk will tend to spring back to its original contour by reason of its inherent resilient characteristics.

Excellent results may be obtained by fabricating the wheel cover 15 out of a synthetic plastic material, such as ethyl cellulose.

The outer edge of the ring section 17 is slightly turned into a lip 19 which overlies the side wall of the tire but is not in direct contact with the tire. This lip 19 extends beyond the outermost edge of the tire rim 10.

When the cover is retained on the wheel, the lip 19 may be manually flexed for the purpose of pulling the outer portion of the cover away from the rim to an extent such as to permit access to the rear side of the ring section 17. Such access may be desired in the event the valve stem 8 does not extend through a hole in the ring section 17 (as shown in Figure 1)

or in the event it becomes necessary to apply balancing weights or the like to the wheel rim 10. In addition, such access is necessary in order to insert a pry-off tool behind the cover for the purpose of prying the cover free from its retaining engagement with the retaining ring 16 attached to the wheel and which will be described more in detail hereinafter. In prying the cover free from the wheel, the pry-off tool or screwdriver is inserted so that its blunt edge engages the folded section 20 of the cover whereby a pry-off force may be directly applied to a reinforced part of the cover.

In order to further rigidify the cover at the point of application of the pry-off force, as well as to ornament the cover at that point, there is provided an ornamental ring 22 which may be made of any suitable material such, for example, as stainless steel. This ornamental ring or bead 22 has underturned edges 23—23, one of which is resiliently wedged in the opening defined by the loop-like folded section 20 of the cover. This annular bead is of a hollow configuration, and extends over and around the hump or shoulder 21 which constitutes the outer edge of the hub cap central section 18 of the cover. The other edge 23 engages the outer surface of the cover section 18.

The ring may be easily applied to the wheel by pressing it axially into retaining cooperation with the rear side of the annular shoulder or hump 21 inside of the opening in the folded section 20. If it is so desired, the ring 22 may be made of a split type, although excellent results may be accomplished by making it in the form of a continuous ring.

The retaining means for holding the wheel cover on the wheel, as noted before, comprises an annular ring 16 having a plurality of outwardly inclined radial teeth 24 adapted to be pressed into biting contact with a flange of the rim 10. This may be effected by merely placing the ring over the flange and then pressing it axially home until the fingers 16 are in their retaining position with the main body of the ring backed up by the wheel spider or body 11. The inner margin of the ring 16 is provided with a plurality of hook-like fingers 25 which, as shown in Figure 1, are less in number than the fingers 24 and may comprise any suitable number, such, for example, as four or five. These fingers 25 are so arranged that their outermost surfaces are in a common circle of a diameter slightly greater than the inner diameter of the folded section 20 of the cover. As a consequence, when the cover is pressed axially home into retaining engagement with the wheel, the rear surface of the folded section 20 of the cover is cammed over the high spots of the springs 25 until such folded section is in the retained position shown in Figure 3. In this position, the extremities of the fingers 25 extend into the interior of the hub cap 18 as well as behind the shoulder 21 of the hub cap section.

As previously stated, the cover may be easily removed by manually flexing the lip portion 19 away from the wheel and inserting a screw driver therebehind for the purpose of engaging the folded section 20 and forcibly prying the same free of its retaining engagement with the fingers 25.

In Figure 4 I have illustrated a modified form of plastic cover designated generally by the reference character 45, and which may be made of the same material as the cover 15, and has substantially the same physical properties. This cover is cooperable with a wheel of the same structure shown in Figure 2, and for that reason, I have used the same numerals as are employed in Figure 2 to designate the tire and rim and body parts of the wheel.

One of the principal differences between this form of cover and that shown in Figure 2 resides in the fact that the cover is provided with different retaining means than is used in the form of Figure 2. The cover, or wheel trim 45 like the cover 15 has an outer convex concave annular portion 46, and a central hub cap simulating portion 47, which portions are connected together by a fold in the material designated by the reference character 48. The folded section 48 opens radially and axially outwardly and is adapted to have mounted therein an annular bead 49, which is identical to the bead 22. In fact, it cooperates in the same manner with the folded section 48 as was true of the bead 22 in the first form. This bead is at the junction of the two portions 46 and 42 and cooperates with the junction in rigidifying the cover at its point of bearing 50 on the wheel body part 11.

This form of cover 45 is retained on the wheel by reason of its outer margin being turned rearwardly at 51 and resiliently fitted into an outer flange 52 of the tire rim part 10.

In applying this cover to the wheel, it is first aligned with the outer edge of the flange 52 and is then pressed axially inwardly and home into retained engagement with the flange 42. During the course of this action, the turned edge 51 rolls along the inner curved surface of flange 52 so as to conform in shape to the curvature of the inner surface of the flange 52. In other words, the hollow turned edge 51 may normally have a maximum diameter slightly greater than the diameter of the inner curved surface of the flange 52, thus necessitating that it be slightly contracted and placed under tension as it is pressed home into retaining engagement with the rim part. This enables a snug and tension fit of the cover on the rim part backed up by the wheel body part at 50. The backing afforded by the wheel body part at 50 limits the inward movement of the cover with respect to the wheel, and also provides a pivotal point about which the portion 46 may flex when it is desired to remove the turned edge 51, by a suitable pry-off tool, from the rim flange 52.

The curvature of portion 46 together with the angle at which it is projected radially and axially inwardly toward the body part causes this portion, in use, to appear to be generally a continuation of the outer side wall of the tire 9. Should the portion 46 be given a white external finish, it, in use, by reason of its configuration and proximity to the tire 9, causes the tire to appear to have a white side wall portion.

In Figure 5 I have illustrated a further modification of the invention somewhat similar to the one shown in Figure 4, but employing a modified form of retaining means for the cover. The wheel and tire parts of this form are identical to those of Figure 4 and hence the same reference numerals are being employed to designate the common parts in the two illustrations. The plastic cover which is similar to the cover 45 is designated generally by the reference character 55 and includes the outer and central concentric portions 56 and 57 joined by an intermediate looped section 58, in which is retained a bead 59 corresponding to the bead 49 of the previous form. This bead, as in all forms, may be made of metal, such as stainless steel, and assists to ornament and rigidify the cover at the junction of the two portions 56 and 57.

The looped section 58 is adapted to bear at 60 upon the wheel body 11 so as to be backed up thereby.

The outer margin of the wheel cover portion 56 is turned axially rearwardly at 61 inside of the outer flange 62 of the tire rim 10. It is provided with a radially outwardly projecting annular shoulder or edge 63 for retaining cooperation with a groove 64 in an annular retaining ring 65. This ring 65 includes a radially extending outer portion 66 which overlaps the outer edge of the flange 62 in close proximity to the outer side wall of tire 9. It also includes a rearwardly turned flange 67 in which is formed the aforesaid groove 64. The flange 67 is provided with a plurality of resilient outwardly turned fingers 68 arranged to be snapped into retaining resilient engagement with the inner curved surface of the outer rim flange 66.

In the use of this form of cover, the retaining ring 65 may be first applied to the wheel by pressing it axially against the rim flange 62. This results in the spaced resilient fingers being cammed radially inwardly over and behind the outer edge of the flange 62 and into resilient retaining engagement therewith. The ring may be made of any suitable material, but excellent results may be obtained by making it of stainless steel since the same lends itself to a highly ornamental lustrous finish.

Thereafter the plastic cover 55 may be aligned with the flange 67 of the ring 65 and pressed axially into the same until its edge or shoulder 63 snaps into the groove 64 of the ring 65. The flexible resilient characteristics of the plastic permits of its edge 63 resiliently snapping into the groove or recess 64 of the retaining ring 65.

The portions of the cover 55 are arranged so that when the edge 63 snaps in the groove 64, the folded section 58 bears against the wheel body part at 60 so as to be backed up thereby.

In this form of the invention, as in the previous form illustrated in Figure 4, the cover may be removed by inserting the edge of a blunt instrument, such as a screw driver or pry-off tool, underneath the outer turned portion of the cover and thereby prying it free of its retaining cooperation with the wheel.

The bead or ring 65 may be similarly removed from the wheel by inserting a screw-driver under its outer turned edge and thus forcibly prying the fingers 68 out of resilient retaining engagement with the turned rim flange 62.

In all forms of the invention, as noted before, the cover may be made of a synthetic plastic material, such as ethyl cellulose. This material enables the cover to have substantial rigidity in the vertical plane of the cover as illustrated and yet enables the concentric outer and central portions of the cover to be transversely deflectable without permanent deformation. In other words, upon deflection, said portions will of their own accord spring or return back to the original contour prior to deflection.

In all forms of the invention, the plastic cover or trim, due to the manner in which the outer annular portion of the same extends both axially and radially inwardly from the plane of the outer edge of the wheel rim part, tends at its outer margin to move under the impulse of centrifugal force toward the medial plane of the tire. Thus, in use, as the wheel is rotated at a high speed, the outer margin of the plastic trim will tend to flex about its reinforced or junction point in a direction toward the rim of the wheel and thus insure a tighter cooperation of the outer annular portion of the cover with the wheel. This tendency is also augmented by reason of the forces set up in the wheel due to the so-called thrust or throw of the wheel as the vehicle is travelling forward.

I claim as my invention:

1. In a cover structure for a wheel including tire rim and body parts, a wheel cover for attachment to an outer side of said wheel and including an outer annular ring section and a central circular section connected together by a junction section of loop-like cross-section, one of said sections adjacent said junction section having an annular shoulder and a reinforcing hollow ring with underturned edge portions engaging opposite sides of said shoulder and also having one of its edge portions extending into the space defined by said junction section and resiliently wedged therein to rigidify and ornament the cover at the junction of said ring and central sections.

2. In a wheel structure including a wheel, a wheel cover including an outer ring section and a central circular section connected together by a folded section of loop-like cross-section, one of the sections connected by the folded section having adjacent the folded section an annular shoulder and a ring with edge portions engaging opposite sides of said shoulder and also having one of the edge portions extending into the space defined by the folded section and resiliently held therein, and means on the wheel for retainingly engaging the rear surface of the folded section to hold the cover on the wheel.

3. In a wheel structure including a wheel, a wheel cover including an outer ring section and a central circular section connected together by a folded section of loop-like cross-section, one of the sections connected by the folded section having adjacent the folded section an annular shoulder and a ring with edge portions engaging opposite sides of said shoulder and also having one of the edge portions extending into the space defined by the folded section and resiliently wedged therein, and means on the wheel for retainingly engaging the rear surface of the folded section to hold the cover on the wheel, said central section comprising a hub cap for the center of the wheel and said shoulder comprising the outer edge of the hub cap.

4. In a wheel structure including a wheel, a wheel cover including an outer ring section and a central circular section connected together by a folded section of loop-like cross-section, one of the sections connected by the folded section having adjacent the folded section an annular shoulder and a ring with edge portions engaging opposite sides of said shoulder and also having one of the edge portions extending into the space defined by the folded section and resiliently held therein, and means on the wheel for retainingly engaging the rear surface of the folded section to hold the cover on the wheel, said central section comprising a hub cap for the center of the wheel and said shoulder comprising the outer edge of the hub cap, said retaining means comprising resilient fingers extending into the interior of the hub cap and on an incline behind said folded section so as to cam the cover into retained engagement with the wheel.

5. In a wheel structure including a wheel, a wheel cover including an outer ring section and a central circular section connected together by a folded section of loop-like cross-section, one of the sections connected by the folded section having adjacent the folded section an annular shoulder and a ring with edge portions engaging opposite sides of said shoulder and also having one of the edge portions extending into the space defined by the folded section and resiliently held therein, and means on the wheel for retainingly engaging the rear surface of the folded section to hold the cover on the wheel, said cover being made of a synthetic plastic material which is resiliently deflectable but resistant to permanent deformation, and said ring section being of such curved cross-section and of such depth as to appear to constitute a part of the side wall of the tire on the wheel.

6. As an article of manufacture, a circular wheel cover having an annular fold radially inwardly of the outer edge of the cover and providing an outwardly opening annular recess, and an annular bead with one of its side edges wedged in said recess and the other edge being disposed exteriorly of the opening, said cover having an annular shoulder adjacent said recess and extending into the interior of said bead for assisting in retaining the bead on the wheel.

7. The structure of claim 7 further characterized by the outer margin of the cover being provided with means for retaining the cover on the wheel.

8. In a cover structure for a wheel including tire rim and body parts, a circular wheel trim of light weight for attachment to an outer side of a wheel comprising an annular portion of relatively thin plastic material and which is comparatively rigid in the general plane of said portion so as to be self-sustaining but transversely resiliently deflectable, said portion having a radially inner part offset substantially radially and axially inwardly toward the body part from the outer margin of said portion and being formed to provide a stiffening relative to which said outer margin is transversely flexible toward and from the rim part, said outer margin of the trim being turned axially rearwardly for detachable retaining cooperation with the rim part of the wheel.

9. In a cover structure for a wheel including tire rim and body parts, a circular wheel trim of light weight for attachment to an outer side of the wheel, comprising an annular portion of relatively thin plastic material and which is comparatively rigid in the general plane of said portion so as to be self-sustaining but transversely resiliently deflectable, said portion having a radially inner part offset substantially radially and axially inwardly toward the body part from the outer margin of said portion and said portion being flexible from said inner part outwardly to afford access to its rear and whereby its outer margin tends to move by centrifugal force toward the wheel, said portion being of curved cross section the curvature of which corresponds generally to that of a side wall of a tire on the rim part so that in use on a wheel said portion will appear to be a radially inner continuation of the side wall of the tire, said outer margin of the trim being turned axially rearwardly for resilient detachable retaining cooperation at the rim part of the wheel.

10. The structure of claim 9 further characterized by the cover inner part being provided with a plastic central hub cap simulating portion which is transversely flexible relative to said bearing on the wheel body member.

11. In a cover structure for a wheel including tire rim and body parts, a circular wheel trim of light weight for attachment to an outer side of a wheel comprising an annular portion of relatively thin plastic material and which is comparatively rigid in the general plane of said portion so as to be self-sustaining but transversely resiliently deflectable, said portion having a radially inner part offset substantially radially and axially inwardly toward the body part from the outer margin of said portion and being formed to provide a stiffening relative to which said outer margin is transversely flexible toward and from the rim part, said outer margin of the trim being formed into a hollow rearwardly projecting curved edge adapted to turn radially inwardly as the same is pressed against the rim part of the wheel for retaining the trim on the wheel under tension.

12. In a cover structure for a wheel including tire rim and body parts, a circular wheel trim of light weight for attachment to an outer side of a wheel comprising an annular portion of relatively thin plastic material and which is comparatively rigid in the general plane of said portion so as to be self-sustaining but transversely resiliently deflectable, said portion having a radially inner part offset substantially radially and axially inwardly toward the body part from the outer margin of said portion and being formed to provide a stiffening relative to which said outer margin is transversely flexible toward and from the rim part, said outer margin of the trim being provided with a separate retaining ring pressed into retained engagement with the rim part of the wheel and having an inner flange cooperable with the outer margin of the trim for detachably retaining the same on the wheel.

13. The structure of claim 12 further characterized by the separate retaining ring having on its inner side radially and axially outwardly turned spring fingers for detachably gripping the inner surface of the rim part of the wheel.

14. In combination in a cover construction of the character described comprising concentric convex integral circular portions of flexible material which is form-sustaining and yet deflectable without permanent deformation, said portions being connected by an integral indentation of substantial reentrant depth, and an annulus of convex cross section in engagement at one edge with the convex surface of one of said portions and having its other edge tucked retainingly into said indentation.

GEORGE ALBERT LYON.

REFERENCES CITED

The following references are of record in the file of this patent:

UNITED STATES PATENTS

| Number | Name | Date |
|---|---|---|
| 2,162,736 | Lyon | June 20, 1939 |
| 2,279,334 | Lyon | Apr. 14, 1942 |
| 1,234,387 | Pugh | July 24, 1917 |
| 2,022,128 | Lyon | Nov. 26, 1935 |